US012759381B2

(12) United States Patent
Roy et al.

(10) Patent No.: US 12,759,381 B2
(45) Date of Patent: Oct. 13, 2026

(54) GLASS RUN CHANNELS INCLUDING MOLDED SUNSHADE HOOKS AND VEHICLES INCLUDING THE SAME

(71) Applicant: TOYODA GOSEI CO., LTD, Kiosu (JP)

(72) Inventors: Pierre-Etienne Roy, Waterville (CA); Yuta Yamato, Kiosu (JP)

(73) Assignee: TOYODA GOSEI CO., LTD., Kiosu (JP)

( * ) Notice: Subject to any disclaimer, the term of this patent is extended or adjusted under 35 U.S.C. 154(b) by 0 days.

(21) Appl. No.: 18/667,466

(22) Filed: May 17, 2024

(65) Prior Publication Data

US 2025/0353364 A1 Nov. 20, 2025

(51) Int. Cl.
*B60J 10/76* (2016.01)
*B29D 99/00* (2010.01)
*B60J 10/273* (2016.01)
*B29K 21/00* (2006.01)
*B29K 105/24* (2006.01)
*B29K 705/00* (2006.01)
*B60J 1/20* (2006.01)

(52) U.S. Cl.
CPC .......... *B60J 10/76* (2016.02); *B29D 99/0003* (2013.01); *B60J 10/273* (2016.02); *B29K 2021/003* (2013.01); *B29K 2105/24* (2013.01); *B29K 2705/00* (2013.01); *B60J 1/2011* (2013.01)

(58) Field of Classification Search
CPC ...... B60J 1/2013; B60J 1/2083; B60J 1/2086; B60J 10/76; B60J 10/77
See application file for complete search history.

(56) References Cited

U.S. PATENT DOCUMENTS

| | | | | |
|---|---|---|---|---|
| 5,010,689 | A * | 4/1991 | Vaughan | B60J 10/76 49/440 |
| 5,089,912 | A * | 2/1992 | Simin | B60J 1/2041 296/97.4 |
| 5,398,451 | A * | 3/1995 | Mesnel | B60J 10/76 49/440 |
| 5,493,814 | A * | 2/1996 | Christian | B60J 10/76 49/377 |
| 5,605,370 | A * | 2/1997 | Ruiz | B60J 1/2086 160/370.22 |
| 8,556,328 | B1 * | 10/2013 | Middleton | B60J 1/2047 296/97.8 |
| 9,132,717 | B2 * | 9/2015 | Usami | B60J 1/2063 |

(Continued)

FOREIGN PATENT DOCUMENTS

| | | | |
|---|---|---|---|
| EP | 0 642 943 | * | 3/1995 |
| EP | 0 930 188 | * | 7/1999 |

*Primary Examiner* — Gregory J Strimbu
(74) *Attorney, Agent, or Firm* — Dinsmore & Shohl LLP

(57) ABSTRACT

A glass run channel includes a header and one or more inserts molded into the header. The header includes an upper header wall, an outer header wall extending from the upper header wall, and an inner header wall extending from the upper header wall opposite the outer header wall. The one or more inserts include an upper insert wall provided within the upper header wall, an insert body extending from the upper insert wall and provided within the inner header wall, and a hook wall extending from the insert body. The header fully surrounds the one or more inserts. A portion of the header surrounding the one or more inserts defines a hook for a sunshade.

16 Claims, 9 Drawing Sheets

(56) References Cited

U.S. PATENT DOCUMENTS

| | | | | |
|---|---|---|---|---|
| 10,406,892 | B2 | 9/2019 | Kim | |
| 2007/0089371 | A1* | 4/2007 | Krause | B60J 10/248 49/441 |
| 2007/0262606 | A1* | 11/2007 | Schnoblen | B60J 1/2047 296/143 |
| 2011/0204671 | A1* | 8/2011 | Baratin | B60J 10/265 296/93 |
| 2012/0247026 | A1* | 10/2012 | Sato | B60J 10/86 49/493.1 |
| 2016/0114656 | A1* | 4/2016 | Hong | B60J 1/2086 160/270 |
| 2023/0145201 | A1* | 5/2023 | Xia | B60J 1/2052 160/370.21 |

* cited by examiner

GLASS RUN CHANNELS INCLUDING MOLDED SUNSHADE HOOKS AND VEHICLES INCLUDING THE SAME

TECHNICAL FIELD

The present specification generally relates to sunshade hooks for vehicles and, more specifically, glass run channels including molded sunshade hooks.

BACKGROUND

It is known to provide vehicles with retractable sunshades that are retained in an extended position by sunshade hooks provided in rear window frames. The sunshade hooks are typically formed by cutting notches into a glass run channel of the window frame after manufacturing of the glass run channel is complete, welding a pair of brackets to the door frame, attaching the glass run channel and aligning the notches with the pair of brackets, and fastening the sunshade hooks to the brackets. A cover is then subsequently attached to the hook to provide a more aesthetic appearance to the overall window frame. In instances in which the window frame includes a pair of sunshade hooks, a total of seven components are necessary for assembly including the glass run channel itself, a pair of brackets to be welded to the door frame, a pair of hooks engaged with a respective one of the pair of brackets, and a pair of covers attached to a respective one of the pair of hooks. The large number of parts increases time for assembly by the customer and further increases the risk of part failure at the time of installation or while in use such as when a sunshade is attached to the pair of hooks.

Accordingly, a need exists for improved glass run channels for vehicles including sunshade hooks that require fewer components so that installation time by the customer and the likelihood of part failure can be significantly reduced.

SUMMARY

In one embodiment, a glass run channel includes: a header; and one or more inserts, wherein the header fully surrounds the one or more inserts, wherein a portion of the header surrounding the one or more inserts defines a hook.

In another embodiment, a vehicle includes: a vehicle body; and a door including an outer door panel, an inner door panel cooperating with the outer door panel to define a receiving area, and a glass run channel provided within the receiving area, the glass run channel including: a header; and one or more inserts encased within the header, wherein a portion of the header surrounding the one or more inserts defines a hook.

In yet another embodiment, a method includes: forming a header including an upper header wall, an outer header wall extending from the upper header wall, and an inner header wall extending from the upper header wall opposite the outer header wall; forming one or more notches in the upper header wall and the inner header wall; positioning one or more inserts within a respective one of the one or more notches, the insert includes an upper insert wall provided within the upper header wall, an insert body extending from the upper insert wall and provided within the inner header wall, and a hook wall extending from the insert body; and injecting material into header to surround the one or more inserts.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
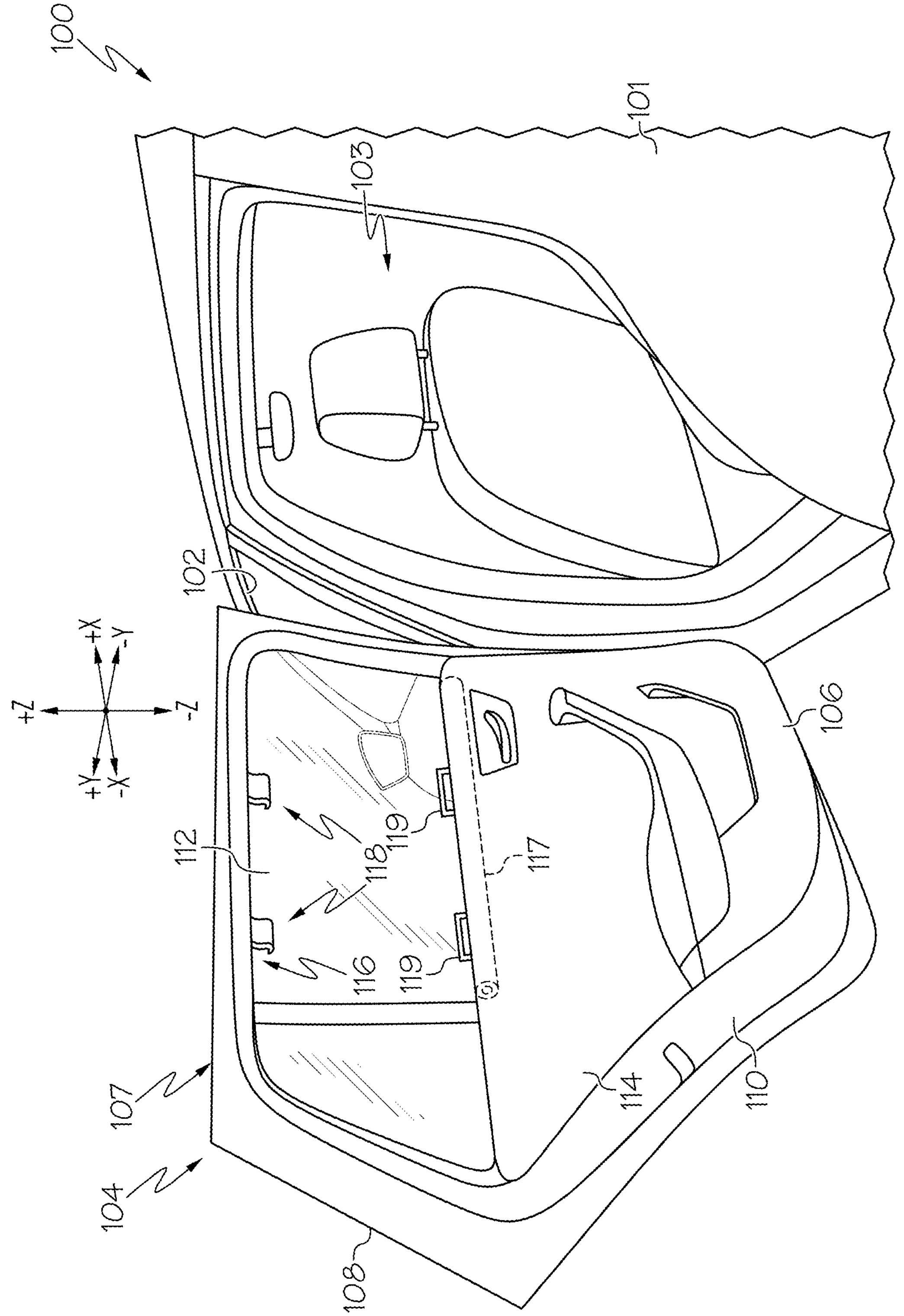
FIG. 1 schematically depicts a partial perspective view of a vehicle including a rear passenger side door in an open position illustrating a glass run channel of the rear passenger side door including a pair of hooks, according to one or more embodiments shown and described herein.

Embodiments described herein are directed to a glass run channels that include one or more sunshade hooks formed by molding one or more inserts into a header of the glass run channel. In particular, the glass run channel includes a header and one or more inserts molded into the header. The header includes an upper header wall, an outer header wall extending from the upper header wall, and an inner header wall extending from the upper header wall opposite the outer header wall. The inserts include an upper insert wall provided within the upper header wall, an insert body extending from the upper insert wall and provided within the inner header wall, and a hook wall extending from the insert body. The header fully surrounds the inserts. A portion of the header surrounding the one or more inserts defines a hook for a sunshade. Various embodiments of the glass run channel and the operation of formation of the glass run channel are described in more detail herein. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the term “vehicle longitudinal direction” refers to the forward-rearward direction of the vehicle (i.e., in the +/−Y direction of the coordinate axes depicted in FIG. 1). The term “vehicle lateral direction” refers to the cross-vehicle direction (i.e., in the +/−X direction of the coordinate axes depicted in FIG. 1), and is transverse to the vehicle longitudinal direction. Specifically, “right” is defined as the positive X direction of the coordinate axes shown in the drawings, and “left” is defined as the negative X direction of the coordinate axes shown in the drawings. The term “vehicle vertical direction” refers to the upward-downward direction of the vehicle (i.e., in the +/−Z direction of the coordinate axes depicted in FIG. 1). As used herein, “upper” and “above” are defined as the positive Z direction of the coordinate axes shown in the drawings. “Lower” and “below” are defined as the negative Z direction of the coordinate axes shown in the drawings. As used herein, the term “rotation direction” refers to a clockwise rotation direction when viewed from a top plan view. Similarly, as used herein, the term “counter-rotation direction” refers to a counter-clockwise rotation direction when viewed from a top plan view.

Referring now to FIG. 1, a vehicle 100 is illustrated according to one or more embodiments described herein. The vehicle 100 includes a vehicle body 101 and one or more doors hingedly attached to the vehicle body 101. The one or more doors may include front doors, such as a driver side door 102 and a front passenger side door, and one or more rear side doors 104. As shown, one of the rear side doors 104 is in an open position to illustrate an inner side 106 of the rear side door 104. The rear side door 104 includes a door frame 107 including an outer door panel 108 provided on an outer side of the rear side door 104, an inner door panel 110 provided on the inner side 106 of the rear side door 104, a window glass pane 112 retractable into a lower door panel 114, and a glass run channel 116 extending along a perimeter of the outer door panel 108 and the inner door panel 110. With the door frame 107 in a closed position relative to the vehicle body 101, the inner door panel 110 faces a passenger compartment 103 of the vehicle 100 and the outer door panel 108 faces a direction opposite the passenger compartment 103. As shown, the glass run channel 116 includes a pair of hooks 118 extending in a direction toward the lower door panel 114. Although FIG. 1 illustrates the glass run channel 116 including a pair of hooks 118, it should be appreciated that the glass run channel 116 may include any number of hooks 118 such as, for example, one, three, or more than three hooks 118. It should be appreciated that the glass run channel 116 may be provided in the driver side door 102 and the front passenger side door of the vehicle 100 such as in an autonomous driving vehicle.

Figure 2:
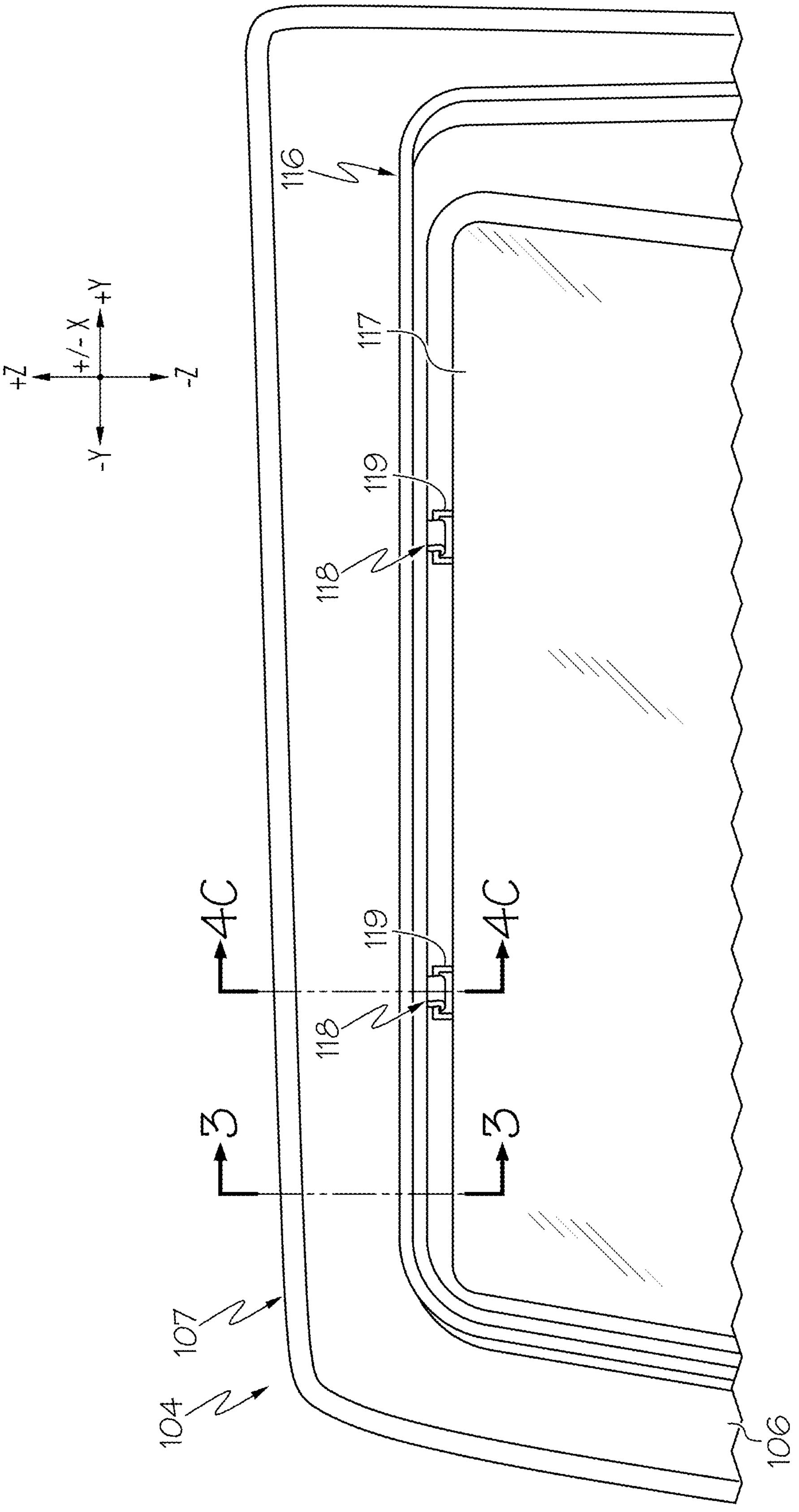
FIG. 2 schematically depicts a partial front view of an inner side of the rear passenger side door of the vehicle, according to one or more embodiments shown and described herein.

It should be appreciated that a retractable sunshade 117 is extendable from the lower door panel 114. The sunshade 117 is positionable between a retracted position, as shown in FIG. 1, and an extended position, as shown in FIG. 2. In the extended position, as shown in FIG. 2, the sunshade 117 extends from the lower door panel 114 and is secured to the hooks 118 by fitting the hooks 118 into corresponding engagement members 119 such as slots, recesses, or the like formed in or extending from an upper edge of the sunshade 117. When the sunshade 117 is no longer desired, the engagement members 119 of the sunshade 117 may be removed from the hooks 118 and the sunshade 117 allowed to retract back into the lower door panel 114 into the retracted position, as shown in FIG. 1.

As shown in FIG. 1, the glass run channel 116 is illustrated as being provided in the rear side door 104. However, it should be appreciated that the glass run channel 116 may be provided in any suitable door such as, for example, the driver side door 102, the front passenger side door, a cargo door, or the like. Additionally, as shown, the vehicle 100 is provided as an automobile which includes coupes, sedans, minivans, trucks, crossovers, hybrids, and sports utility vehicles. However, the glass run channel 116 is not limited to automobiles. In embodiments, the glass run channel 116 may be provided in any vehicle such as a watercraft, aircraft, or the like.

Referring now to FIG. 2, a partial view of the inner side 106 of the rear side door 104 is shown. As described herein, the glass run channel 116 includes a pair of hooks 118. The hooks 118 are spaced apart from one another. It should be appreciated that the particular location of the hooks 118 along the glass run channel 116 correspond to the location of slots formed in the sunshade described herein. Therefore, it should be appreciated that the particular location of the hooks 118 is not limited to that illustrated here. For example, the hooks 118 may be located further in either the forward vehicle longitudinal direction (i.e., +Y direction) or the rearward vehicle longitudinal direction (i.e., −Y direction). Additionally, the hooks 118 may be located closer to or further from one another other than that depicted herein.

Figure 3:
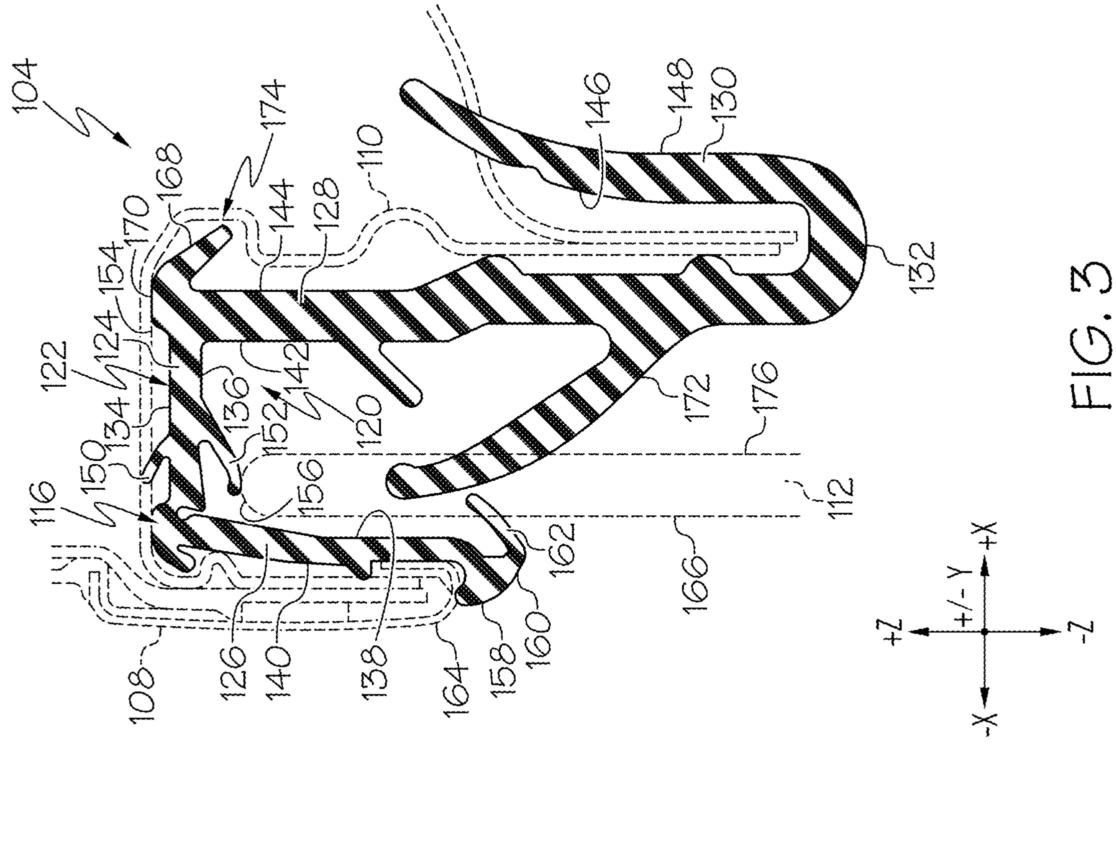
FIG. 3 schematically depicts a partial cross-sectional view of the rear passenger side door taken along line 3-3 in FIG. 2, according to one or more embodiments shown and described herein.

Referring now to FIG. 3, a partial cross-sectional view of the rear side door 104 taken along line 3-3 in FIG. 2 is illustrated. As shown, the glass run channel 116 is provided within a receiving area 120 defined between the outer door panel 108 and the inner door panel 110. The glass run channel 116 includes a header 122. In embodiments, the header 122 is extruded from any suitable extrusion material for providing a watertight seal with the window glass pane

112. In embodiments, the header 122 is extruded from rubber or plastic, and more particularly thermoplastic vulcanizate (TPV). In embodiments, the header 122 is an integrally formed, one-piece component. In embodiments, the header 122 is an integrally extruded, one-piece component.

The header 122 includes an upper header wall 124, an outer header wall 126 extending from the upper header wall 124, an inner header wall 128 extending from the upper header wall 124 opposite the outer header wall 126, and a cover lip 130 extending from a distal end 132 of the inner header wall 128 opposite the upper header wall 124. The upper header wall 124 has an upper surface 134 and a lower surface 136 opposite the upper surface 134. The outer header wall 126 has an inner surface 138 and an outer surface 140 opposite the inner surface 138. The inner header wall 128 has an inner surface 142 and an outer surface 144 opposite the inner surface 142. The cover lip 130 has an inner surface 146 and an outer surface 148 opposite the inner surface 146. The upper header wall 124, the outer header wall 126, and the inner header wall 128 of the header 122 may include any number of ribs, protrusions, flanges, or the like to ensure a watertight seal with the outer door panel 108, the inner door panel 110, and the window glass pane 112, and to secure the glass run channel 116 within the receiving area 120.

In embodiments, the upper header wall 124 includes a first upper protrusion 150 extending from the upper surface 134 of the upper header wall 124, and a second upper protrusion 152 extending from the lower surface 136 of the upper header wall 124. The first upper protrusion 150 contacts an upper wall 154 of the inner door panel 110, and the second upper protrusion 152 contacts an upper edge 156 of the window glass pane 112 when the window glass pane 112 is in a raised position, as shown in dashed lines.

In embodiments, the outer header wall 126 includes a first outer protrusion 158 extending from a lower end 160 of the outer header wall 126 in a direction opposite the inner header wall 128, and a second outer protrusion 162 extending from the lower end 160 of the outer header wall 126 in a direction toward the inner header wall 128. The first outer protrusion 158 contacts a lower end 164 of the outer door panel 108 to secure the header 122 to the outer door panel 108, and the second outer protrusion 162 contacts an outer surface 166 of the window glass pane 112 when the window glass pane 112 is in the raised position, as shown.

In embodiments, the inner header wall 128 includes a first inner protrusion 168 extending from an upper end 170 and the outer surface 144 of the inner header wall 128 in a direction opposite the outer header wall 126, and a second inner protrusion 172 extending from the inner surface 142 of the inner header wall 128 in a direction toward the outer header wall 126. The first inner protrusion 168 is received within a recess 174 formed in the inner door panel 110 to secure the header 122 to the inner door panel 110, and the second inner protrusion 172 contacts an inner surface 176 of the window glass pane 112 when the window glass pane 112 is in the raised position, as shown.

As shown in FIG. 3, the second outer protrusion 162 and the second inner protrusion 172 are illustrated as overlapping the window glass pane 112. However, it should be appreciated that the second outer protrusion 162 and the second inner protrusion 172 are flexible so as to deform toward the outer header wall 126 and the inner header wall 128, respectively, to permit the window glass pane 112 to extend between the second outer protrusion 162 and the second inner protrusion 172 when the window glass pane 112 is in the raised position.

Figure 4A:
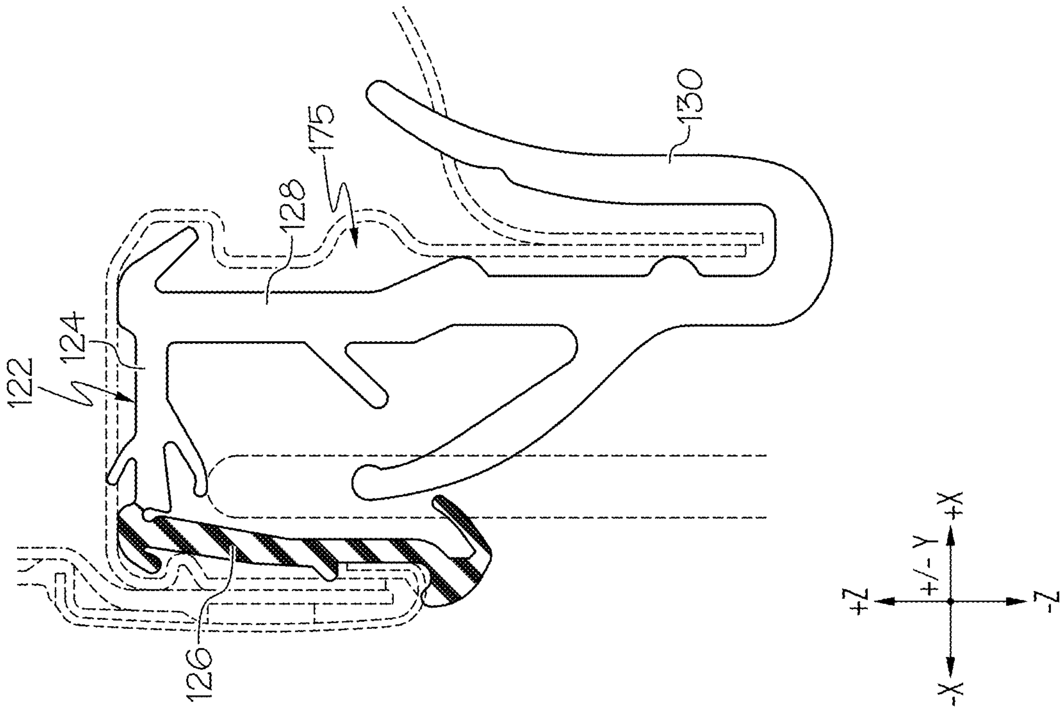
FIG. 4A schematically depicts a partial cross-sectional view of the glass run channel having a notch formed therein, according to one or more embodiments shown and described herein.

Referring now to FIG. 4A, a partial cross-sectional view of the header 122 is shown with a notch 175 formed in the header 122. Specifically, the notch 175 is shown formed in the upper header wall 124, the inner header wall 128, and the cover lip 130. However, it should be appreciated that, in embodiments, the notch 175 may be formed in the outer header wall 126 as well. Although only a single notch 175 is shown in FIG. 4A, it should be appreciated that any number of notches 175 may be formed in the header 122 extending in the vehicle longitudinal direction (i.e., the +/−Y direction). For example, the header 122 may include two, three, or more than three notches 175.

Figure 4C:
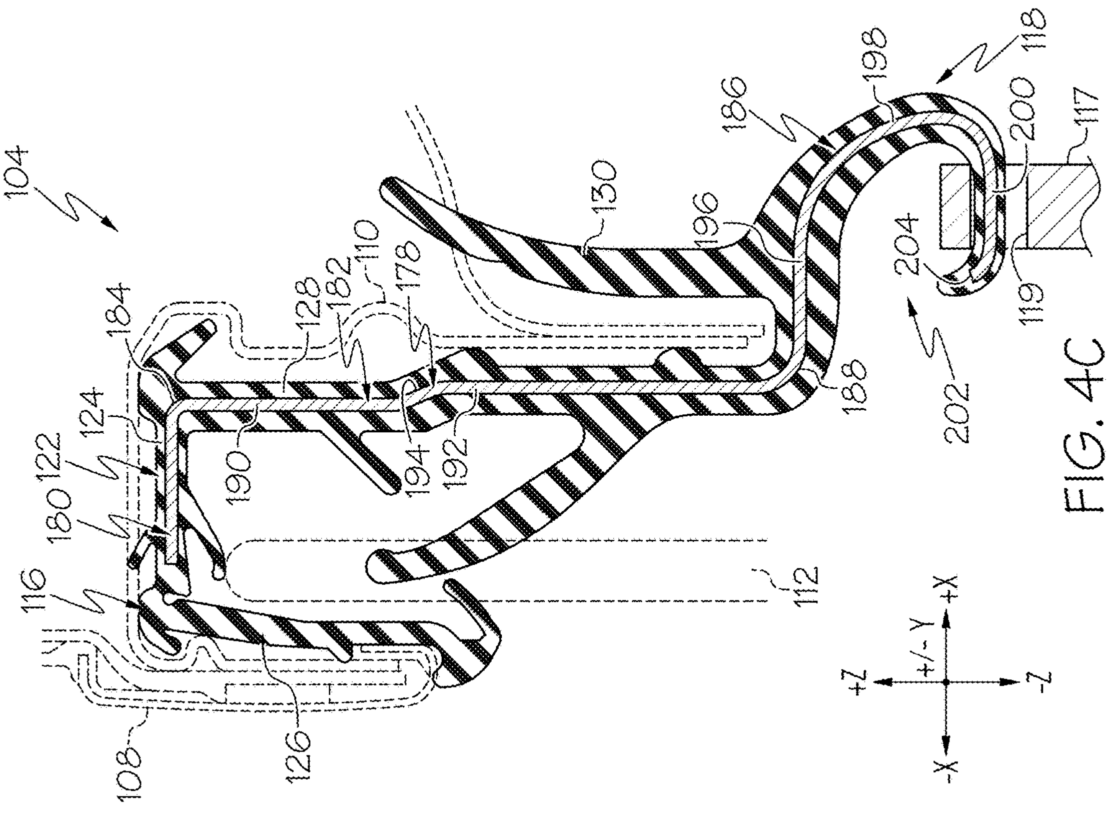
FIG. 4C schematically depicts a partial cross-sectional view of the rear passenger side door taken along line 4C-4C in FIG. 2, according to one or more embodiments shown and described herein.
Figure 4B:
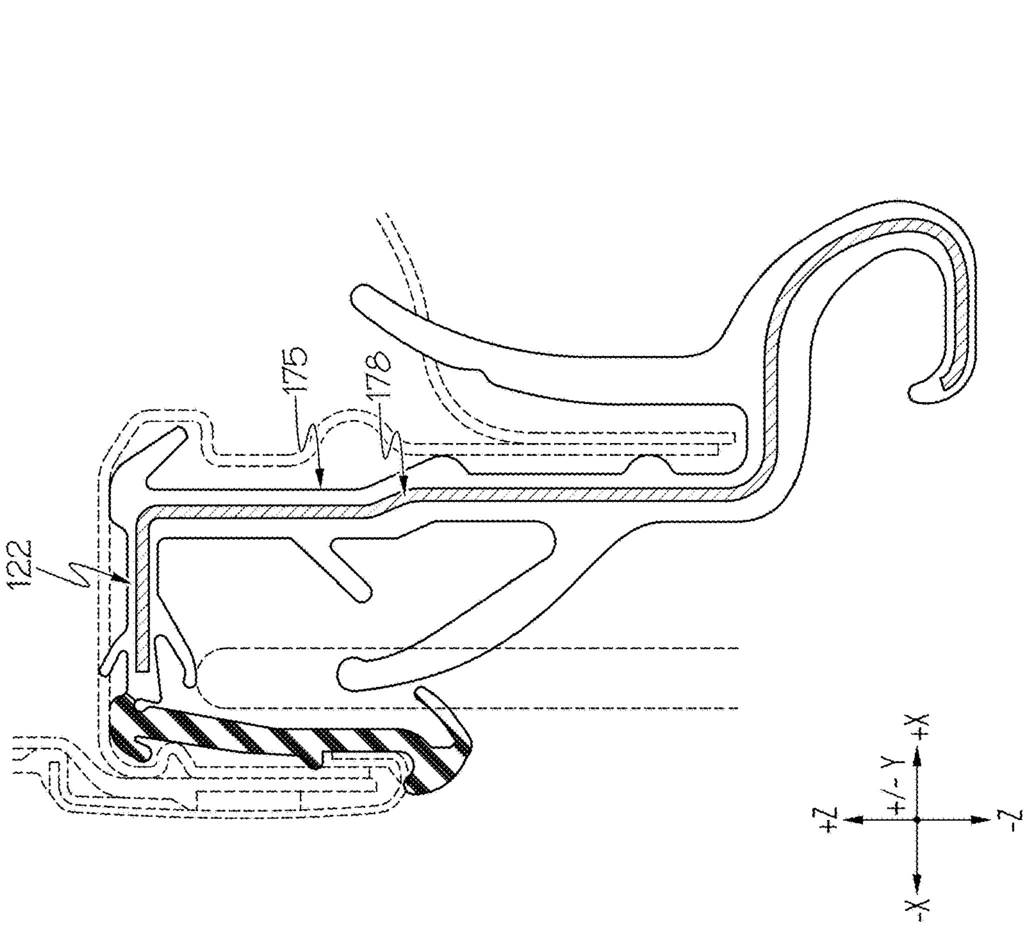
FIG. 4B schematically depicts a partial cross-sectional view of the glass run channel with an insert positioned within the notch, according to one or more embodiments shown and described herein.

Referring now to FIG. 4B, a partial cross-sectional view of the header 122 is shown with an insert 178 position within the notch 175. As described herein, any number of inserts 178 may be positioned within the header 122. Accordingly, the number of notches 175 formed in the header 122 correspond to the number of inserts 178 provided.

Referring now to FIG. 4C, a partial cross-sectional view of the rear side door 104 taken along line 4C-4C in FIG. 2 is illustrated the insert 178 encased within the material forming the header 122. As shown in FIG. 4C, the hook 118 of the glass run channel 116 engages the engagement member 119 of the sunshade 117. With more particularity, the insert 178 is shown extending within the upper header wall 124 and the inner header wall 128 of the header 122. In embodiments, the insert 178 is formed of a material different from the material forming the glass run channel 116. In embodiments, the insert 178 is formed of a metal, metallic alloy, or metallic material.

The insert 178 includes an upper insert wall 180, an insert body 182 extending in the vehicle vertical direction (i.e., +/−Z direction) from an end 184 of the upper insert wall 180, and a hook wall 186 extending from a lower end 188 of the insert body 182 opposite the upper insert wall 180. The insert body 182 includes an upper insert body portion 190 extending from the upper insert wall 180, and a lower insert body portion 192 extending from the hook wall 186. A step 194 is formed between the upper insert body portion 190 and the lower insert body portion 192 such that the lower insert body portion 192 is recessed further from the outer header wall 126 of the header 122 relative to the upper insert body portion 190, as shown in FIG. 4C. The upper insert wall 180 is provided within the upper header wall 124 of the header 122, and the insert body 182 is provided within the inner header wall 128 of the header 122. As will be discussed in greater detail below, the insert 178 is overmolded into the glass run channel 116 such that the insert 178 is completely surrounded by the material forming the header 122. However, as referred to herein, the hook wall 186 of the insert 178 and a portion of the header 122 surrounding the hook wall 186 of the insert 178 define the hook 118 of the glass run channel 116.

Figure 5:
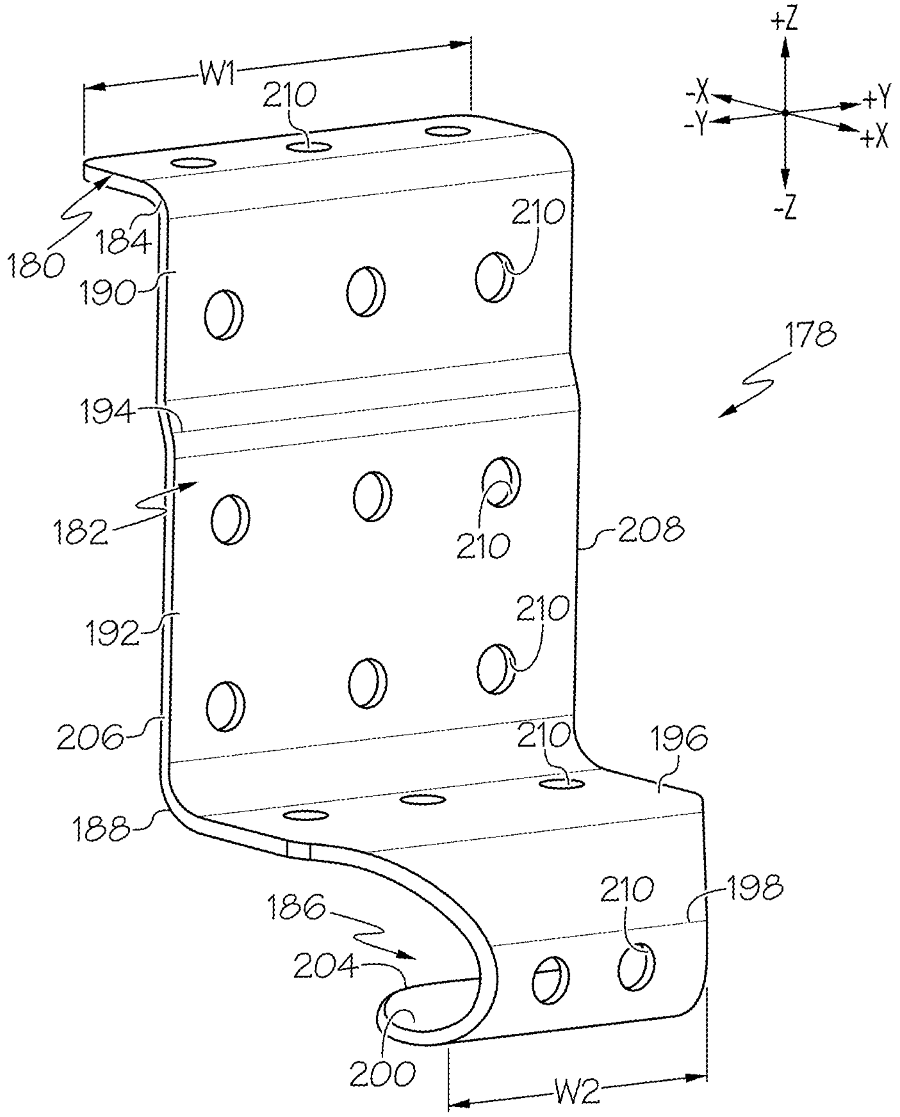
FIG. 5 schematically depicts a perspective view of an insert of the glass run channel, according to one or more embodiments shown and described herein.

As shown in FIGS. 4C and 5, the hook wall 186 of the insert 178 includes a first portion 196 extending from the lower end 188 of the insert body 182 in the vehicle lateral direction (i.e., +/−X direction) opposite the outer header wall 126 of the header 122, a second portion 198 extending from the first portion 196 in a direction opposite the upper insert wall 180, and a third portion 200 extending from the second portion 198 opposite the first portion 196 and in the vehicle lateral direction (i.e., +/−X direction) toward the outer header wall 126 of the header 122. Accordingly, the hook wall 186 defines an opening 202 that faces the outer header wall 126 of the header 122. In embodiments, the first portion 196 and the second portion 198 of the hook wall 186 extend substantially parallel to the upper insert wall 180. In embodiments, a distal end 204 of the third portion 200 opposite the second portion 198 of the hook wall 186 extends in the upward vehicle vertical direction (i.e., +Z direction) toward the first portion 196 of the hook wall 186.

As shown in FIG. 5, a perspective view of the insert 178 is shown separate from the header 122 (FIG. 4C). The insert 178 has a first side edge 206 and a second side edge 208 extending along each of the upper insert wall 180, the insert body 182, and the hook wall 186. In embodiments, the insert 178 has a first width W1 at the upper insert wall 180 extending in the vehicle longitudinal direction (i.e., +/−Y direction) between the first side edge 206 and the second side edge 208, and a second width W2 at the third portion 200 of the hook wall 186 that is less than the first width W1. Accordingly, the first side edge 206 and the second side edge 208 of the insert 178 taper inwardly from the first portion 196 of the hook wall 186 to the third portion 200 of the hook wall 186.

Referring still to FIG. 5, in embodiments, the upper insert wall 180, the insert body 182, and the hook wall 186 of the insert 178 each have a plurality of holes 210 formed therein. The holes 210 may be arranged in any suitable manner such as, for example, arrayed in rows and columns. Each row of holes 210 may include one, two, three, or more than three holes 210. The holes 210 permit injected material to flow through the insert 178 to contact opposite sides of the insert 178. This prevents the insert 178 from moving within the material injected around the insert 178, as described in more detail below. In embodiments, due to the second width W2 being less than the first width W1, the second portion 198 of the hook wall 186 has less holes 210 than the number of holes 210 formed in any given row of holes 210 of the upper insert wall 180 and the insert body 182.

Figure 6:
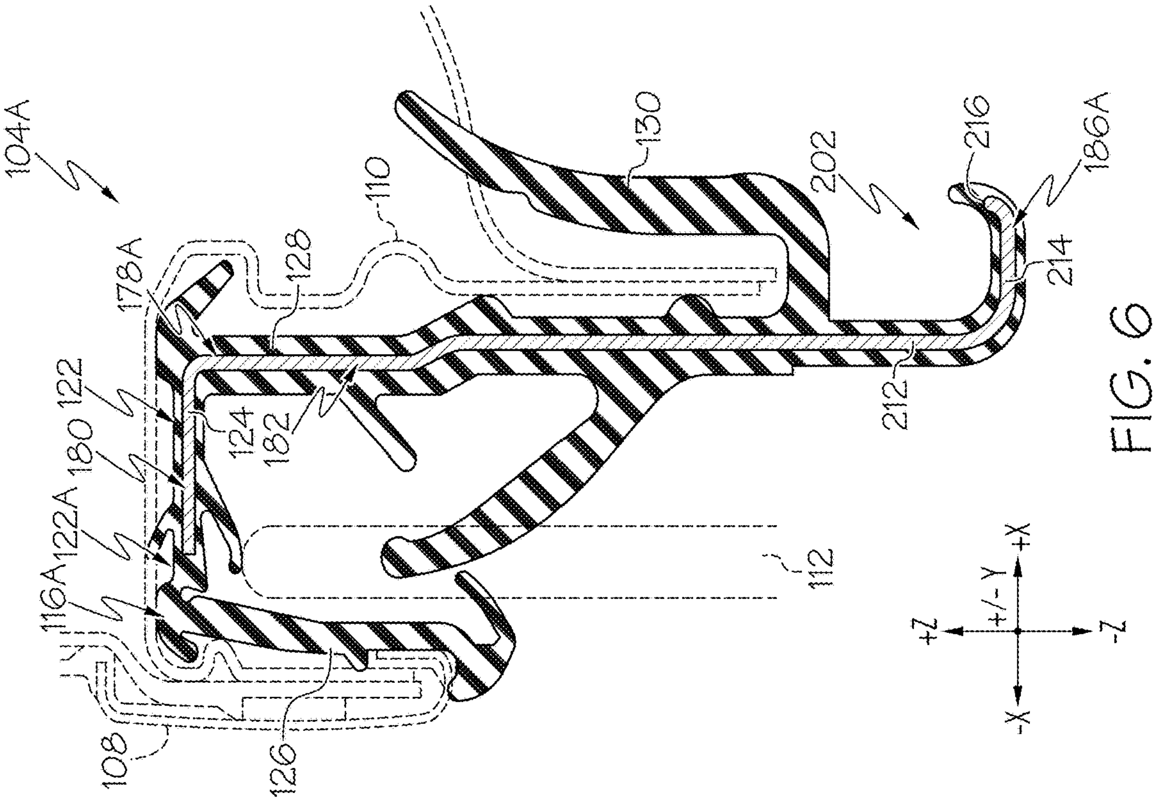
FIG. 6 schematically depicts a partial cross-sectional view of another rear passenger side door including another embodiment of a glass run channel, according to one or more embodiments shown and described herein.

Referring now to FIG. 6, a partial cross-sectional view of another embodiment of a rear side door 104A is illustrated including a glass run channel 116A. As with the glass run channel 116 illustrated in FIG. 4C, the glass run channel 116A includes a header 122A and an insert 178A. It should be appreciated that the glass run channel 116A is substantially similar to the glass run channel 116 illustrated in FIG. 4C. Therefore, like reference numbers will be used to refer to like parts. However, contrary to the insert 178 of the glass run channel 116 illustrated in FIG. 4C in which the opening 202 defined by the hook wall 186 faces the outer header wall 126 of the header 122, the insert 178A illustrated in FIG. 6 has a hook wall 186A defining the opening 202 facing a direction opposite the outer header wall 126 of the header 122A.

Figure 7:
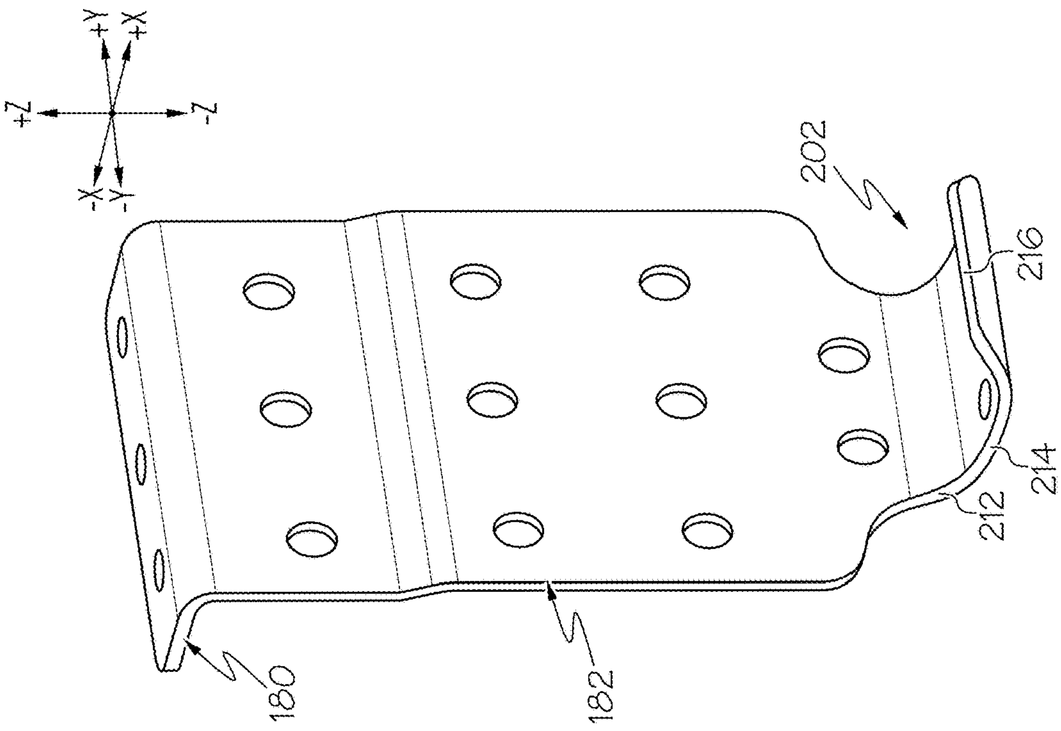
FIG. 7 schematically depicts a perspective view of an insert of the glass run channel of FIG. 6, according to one or more embodiments shown and described herein.

Specifically, as shown in FIGS. 6 and 7, the hook wall 186A of the insert 178A includes a first portion 212 extending in the vehicle vertical direction (i.e., +/−Z direction) from and in line with the insert body 182 of the insert 178A, and a second portion 214 extending in the vehicle lateral direction (i.e., +/−X direction) from an end of the first portion 212 opposite the insert body 182. In embodiments, a distal end 216 of the second portion 214 of the hook wall 186A opposite the first portion 212 of the hook wall 186A extends in the upward vehicle vertical direction (i.e., +Z direction) toward the cover lip 130 of the header 122A (FIG. 6) and the upper insert wall 180. Accordingly, the hook wall 186A cooperates with the cover lip 130 of the header 122A to define the opening 202 that faces a direction opposite the outer header wall 126 of the header 122A.

Figure 8:
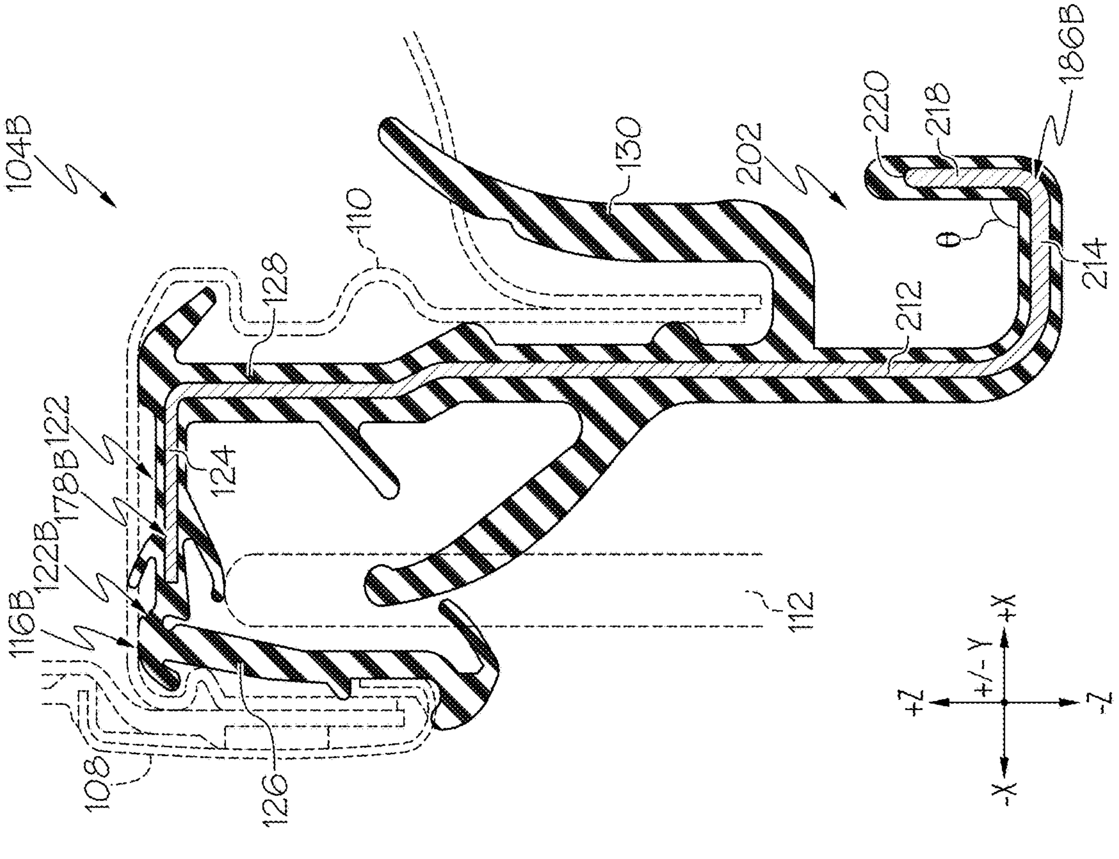
FIG. 8 schematically depicts a partial cross-sectional view of another rear passenger side door including another embodiment of a glass run channel, according to one or more embodiments shown and described herein.

Referring now to FIG. 8, a partial cross-sectional view of another embodiment of a rear side door 104B is illustrated including a glass run channel 116B. As with the glass run channel 116A illustrated in FIG. 6, the glass run channel 116B includes a header 122B and an insert 178B. It should be appreciated that the glass run channel 116B is substantially similar to the glass run channel 116A illustrated in FIG. 6. Therefore, like reference numbers will be used to refer to like parts. However, contrary to the hook wall 186A of the glass run channel 116A illustrated in FIG. 6 in which the distal end 216 of the second portion 214 of the hook wall 186A extends in the upward vehicle vertical direction (i.e., +Z direction) toward the upper header wall 124 and the cover lip 130 of the header 122, the insert 178B includes hook wall 186B including a third portion 218 extending in the upward vehicle vertical direction (i.e., +Z direction) further toward the cover lip 130, thereby closing the opening 202 defined by the hook wall 186B of the insert 178B and the cover lip 130 of the header 122B. In other words, a distance between a distal end 220 of the third portion 218 of the hook wall 186B and the cover lip 130 of the header 122B is less than a distance between the distal end 216 of the second portion 214 of the hook wall 186A of FIG. 6 and the cover lip 130.

As shown in FIG. 8, the third portion 218 of the hook wall 186B extends parallel to the first portion 212 of the hook wall 186B and substantially perpendicular to the second portion 214 of the hook wall 186B. In embodiments, the third portion 218 of the hook wall 186B extends at a non-perpendicular angle to the second portion 214 of the hook wall 186B. In embodiments, an angle θ between the third portion 218 of the hook wall 186B and the second portion 214 of the hook wall 186B is equal to or greater than 10 degrees and less than or equal to 160 degrees. In embodiments, an angle θ between the third portion 218 of the hook wall 186B and the second portion 214 of the hook wall 186B is equal to or greater than 40 degrees and less than or equal to 130 degrees. In embodiments, the angle θ between the third portion 218 of the hook wall 186B and the second portion 214 of the hook wall 186B is equal to or greater than 60 degrees and less than or equal to 120 degrees. In embodiments, the angle θ between the third portion 218 of the hook wall 186B and the second portion 214 of the hook wall 186B is equal to or greater than 75 degrees and less than or equal to 105 degrees. The third portion 218 of the hook wall 186B is completely straight such that the distal end 220 of the third portion 218 does not extend in the vehicle lateral direction (i.e., +/−X direction).

Figure 9:
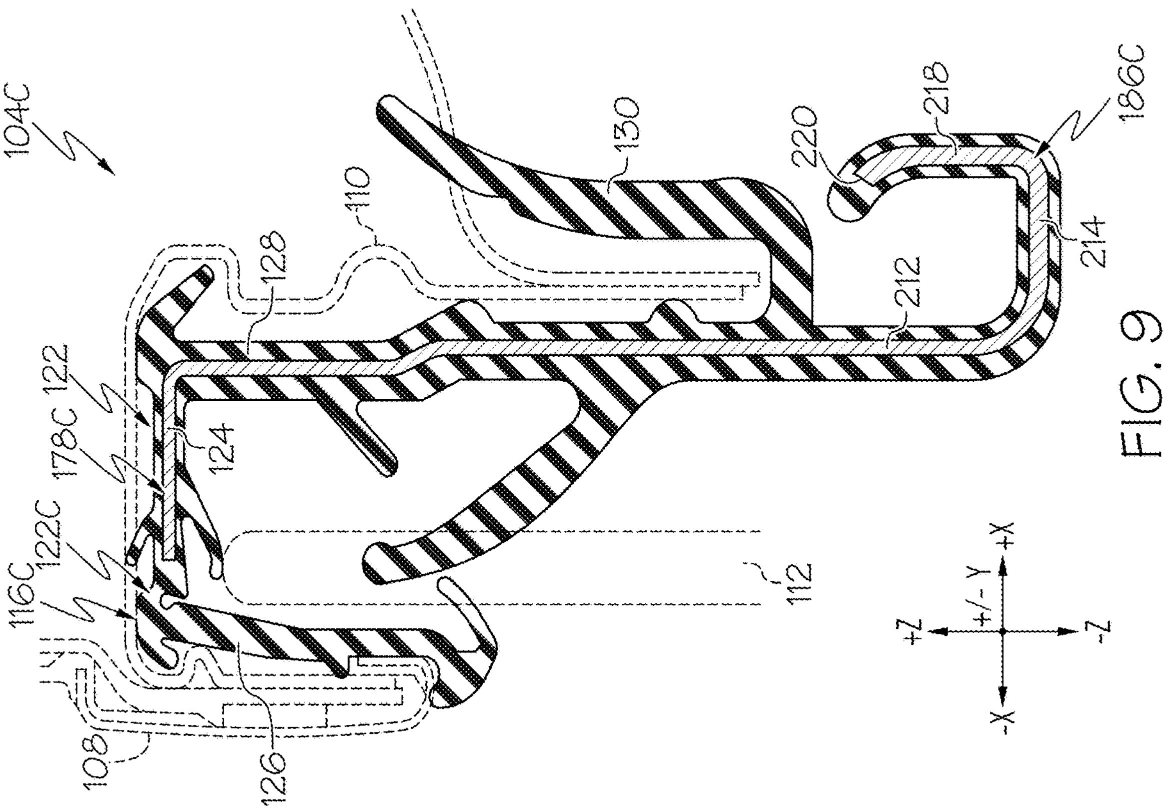
FIG. 9 schematically depicts a partial cross-sectional view of another rear passenger side door including another embodiment of a glass run channel, according to one or more embodiments shown and described herein.

Referring now to FIG. 9, a partial cross-sectional view of another embodiment of a rear side door 104C is illustrated including a glass run channel 116C. As with the glass run channel 116B illustrated in FIG. 8, the glass run channel 116C includes a header 122C and an insert 178C. It should be appreciated that the glass run channel 116C is substantially similar to the glass run channel 166B illustrated in FIG. 8. Therefore, like reference numbers will be used to refer to like parts. However, contrary to the hook wall 186B of the glass run channel 116B illustrated in FIG. 8 in which the third portion 218 is straight, the distal end 220 of the third portion 218 of a hook wall 186C opposite the second portion 214 of the hook wall 186C extends in a vehicle lateral direction toward the first portion 212 of the hook wall 186C (i.e., −X direction). Accordingly, a distance between the distal end 220 of the third portion 218 of the hook wall 186C and the first portion 212 of the hook wall 186C is less than a distance between the distal end 220 of the third portion 218 of the hook wall 186B of FIG. 8 and the first portion 212 of the hook wall 186B.

Figure 10:
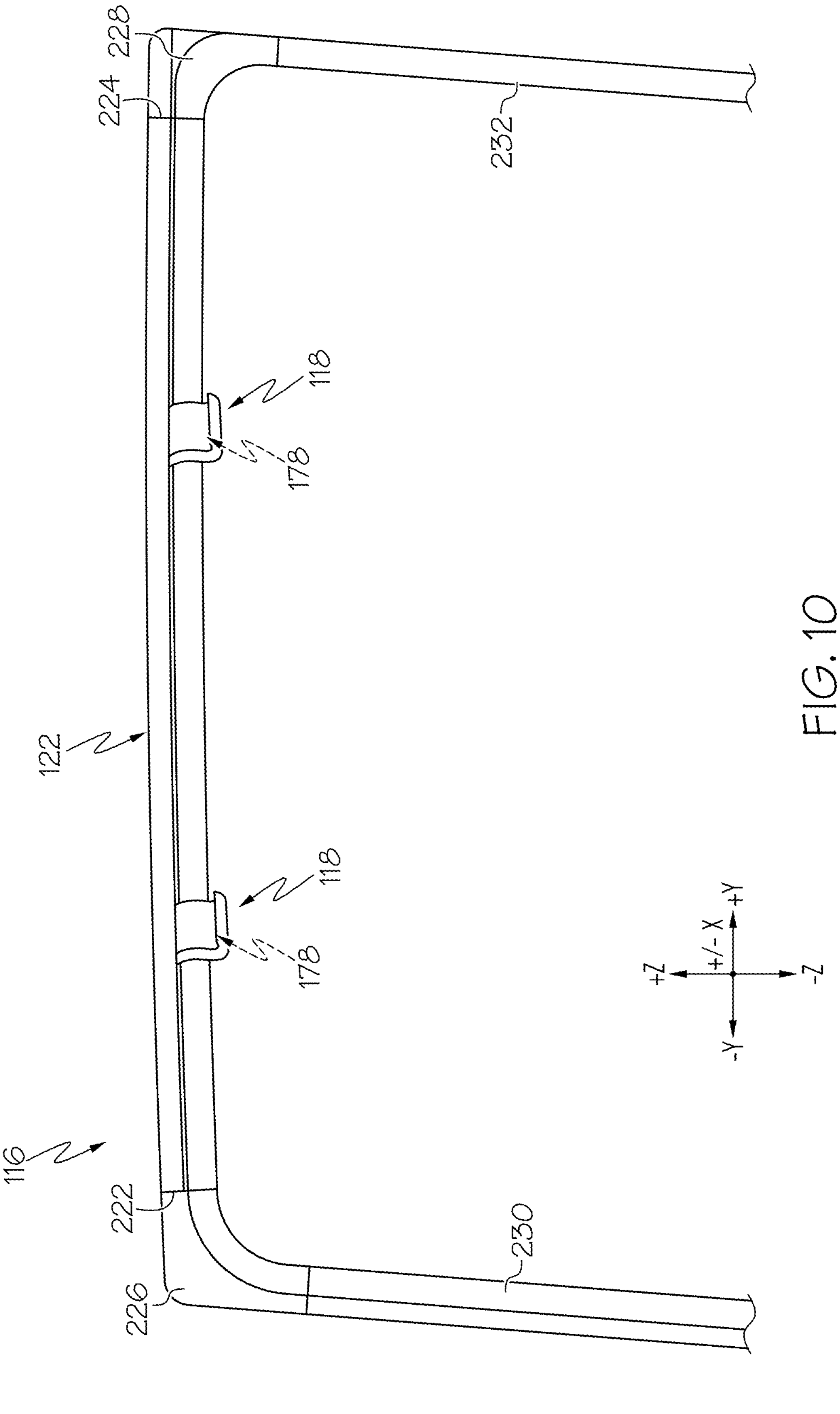
FIG. 10 schematically depicts a partial front view of an inner side of the glass run channel of FIG. 1, according to one or more embodiments shown and described herein.

Referring now to FIG. 10, the glass run channel 116 of FIG. 4C is shown including the header 122 and the pair of inserts 178 encased by the material forming the header 122 to define the pair of hooks 118. The header 122 has a first end 222 and a second end 224 opposite the first end 222. The glass run channel 116 further includes a first corner member 226 provided at the first end 222 of the header 122, and a second corner member 228 provided at the second end 224 of the header 122. In embodiments, the first corner member 226 and the second corner members 228 each form substantially right angles. The glass run channel 116 further includes a first vertical member 230 provided at the first corner member 226 opposite the first end 222 of the header 122, and a second vertical member 232 provided at the second corner member 228 opposite the second end 224 of the header 122. Accordingly, in embodiments, the first vertical member 230 and the second vertical member 232 extend substantially perpendicular to the header 122. In embodiments, the first corner member 226 and the second corner member 228 are formed from the same material that forms the header 122. In embodiments, the first vertical member 230 and the second vertical member 232 are formed from the same material that forms the header 122. In other embodiments, the first corner member 226 and the second corner member 228 may be formed from a material different from the header 122, the first vertical member 230, and the second vertical member 232. For example, the first corner member 226 and the second corner member 228 may be formed from plastic while the header 122, the first vertical member 230, and the second vertical member 232 are formed from rubber. Other combinations of materials forming the individual components of the glass run channel 116 are contemplated as being within the scope of the present disclosure. Although the header 122 is described herein as being attached to the first corner member 226, the second corner member 228, the first vertical member 230, and the second vertical member 232, it should be appreciated that the headers 122A, 122B, 122C and the inserts 178A, 178B, 178C illustrated in FIGS. 6, 8, and 9, respectively, may be joined to the first corner member 226, the second corner member 228, the first vertical member 230, and the second vertical member 232 in a similar manner as described herein.

Figure 11:
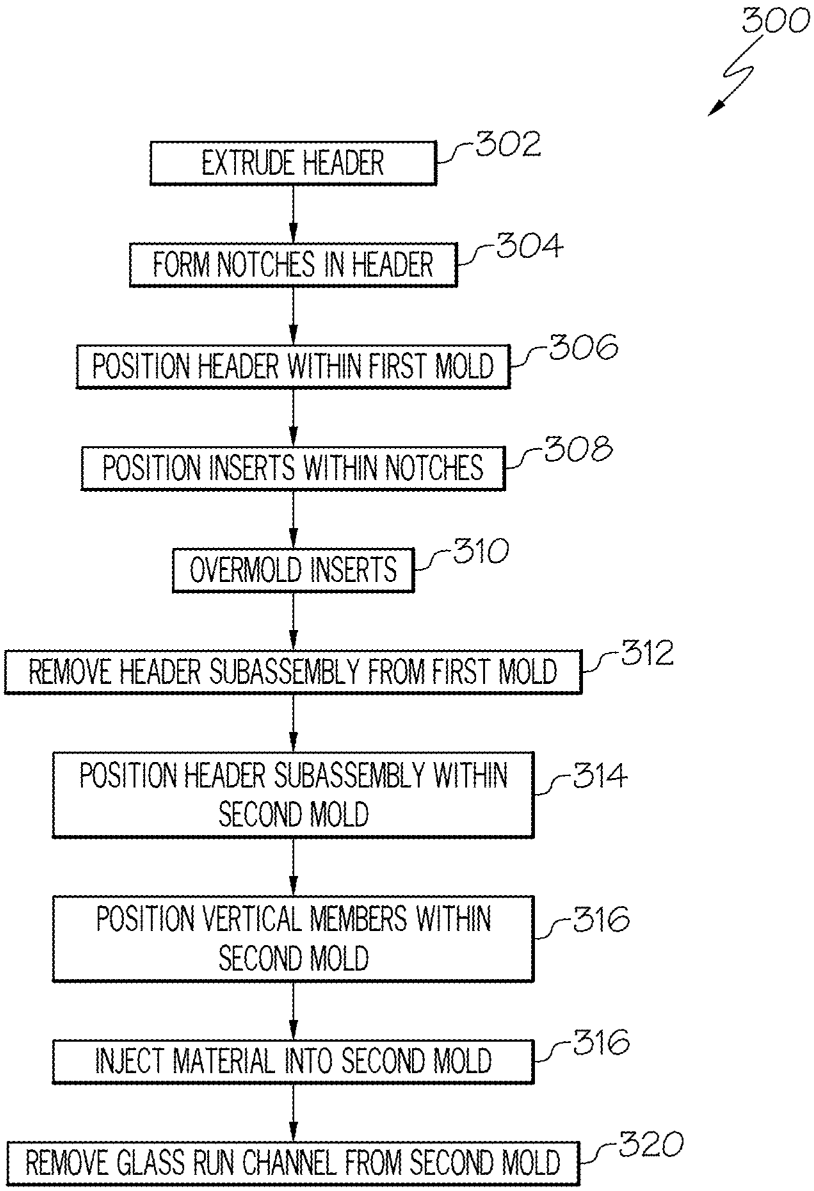
FIG. 11 depicts a flow diagram of a method for forming a glass run channel, according to one or more embodiments shown and described herein.

Referring now to FIG. 11, and with reference to the glass run channel 116 illustrated in FIGS. 3, 4C, and 10, a flow diagram is illustrated depicting a method 300 of forming the glass run channel 116. It should be appreciated that the glass run channel 116 may be formed in any suitable manner other than that described herein. At step 302, the header 122 is formed from any suitable material such as, for example, TPV. In embodiments, as described herein, the header 122 is formed by extrusion. However, the header 122 may be formed in any other suitable method. At step 304, one or more notches 175, as shown in FIG. 4A, are then formed in the upper header wall 124 and the inner header wall 128 corresponding to a location at which the one or more inserts 178 will be provided to define the respective hook 118 within the glass run channel 116. The notches 175 may be formed by cutting material out of the upper header wall 124 and the inner header wall 128. At step 306, the header 122 is positioned within a first mold. Thereafter, at step 308, the inserts 178 are positioned within a respective notch 175 formed in the header 122. At step 310, material is injected into the first mold, such as by injection molding, or the like, to overmold the inserts 178 onto the header 122 such that the inserts 178 are encased in the material. The material inserted into the first mold may be the same as the material originally used to form the header 122 or may be a different material. For example, the material inserted into the first mold to overmold the inserts 178 to the header 122 may be, for example, TPV. Accordingly, the inserts 178 are completely surrounded by the material forming the header 122. Once the inserts 178 are overmolded onto the header 122, the header 122 and inserts 178, forming a header subassembly, are removed from the first mold at step 312.

At step 314, the header subassembly is then positioned into a second mold. Thereafter, at step 316, the first vertical member 230 and the second vertical member 232 are inserted into the second mold at opposite ends of the header 122. Specifically, the first vertical member 230 is positioned within the second mold proximate the first end 222 of the header 122, and the second vertical member 232 is positioned within the second mold proximate the second end 224 of the header 122. Thereafter, at step 318, additional material is injected into the mold, such as by injection molding, or the like. The material injected into the second mold forms the first corner member 226 and the second corner member 228, thereby joining the first vertical member 230 and the second vertical member 232 to the header 122 to form the glass run channel 116. The material inserted into the second mold may be the same as the material originally used to form the header 122 or may be a different material. For example, the material inserted into the second mold to form the first corner member 226 and the second corner member 228 may be, for example, TPV. Thereafter, at step 320, the header 122, including the inserts 178, which is joined to the first vertical member 230 and the second vertical member 232 by the first corner member 226 and the second corner member 228, respectively, is removed from the second mold.

In embodiments in which the header 122, the first corner member 226, the second corner member 228, the first vertical member 230, and the second vertical member 232 are formed from the same material, the header 122, the first corner member 226, the second corner member 228, the first vertical member 230, and the second vertical member 232 may be molded at the same time. Molding the header 122, the first corner member 226, the second corner member 228, the first vertical member 230, and the second vertical member 232 at the same time eliminates the need for certain steps described herein. Additionally, in embodiments, the notches 175 may be formed within the header 122 either during initial extrusion or forming of the header 122. This removes the need for step 304 in which the notches 175 are subsequently formed in the header 122 after extruding or forming the header 122. In other embodiments, the inserts 178 may be positioned within a mold prior to forming the header 122, and the material forming the header 122 subsequently inserted into the mold to overmold and encase the inserts 178. This removes the need to separately form the notches 175 within the header 122.

From the above, it is to be appreciated that defined herein is a glass run channel including a header and one or more inserts molded into the header. One or more notches are formed within the header corresponding to a location at which the inserts are to be positioned within the header. Once the inserts are positioned within the header, Additional material is injected back into the header to fully surround the inserts, thereby molding the inserts to the header to define a hook for a sunshade.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A glass run channel comprising:
a header comprising:
an outer header wall;
an upper header wall extending from the outer header wall;
an inner header wall extending from the upper header wall;
a cover lip extending from a distal end of the inner header wall; and
a hook portion initially extending from the distal end of the inner header wall below the cover lip in a direction away from the cover lip; and
one or more inserts encased within the header, the one or more inserts including an upper insert wall provided within the upper header wall, an insert body extending from the upper insert wall within the inner header wall, and a hook wall initially extending from a lower end of the insert body, extending in a direction away from the upper insert wall, and extending through the hook portion of the header,
wherein the hook portion of the header surrounding the hook wall of the one or more inserts defines a hook having an opening formed below and between the cover lip and a distal end of the hook portion, the hook extending in a direction toward the outer header wall.

2. The glass run channel of claim 1, wherein the one or more inserts comprises a plurality of inserts spaced apart from one another.

3. The glass run channel of claim 1, wherein the one or more inserts is formed from metal.

4. The glass run channel of claim 1, wherein the hook wall of the one or more inserts defines the opening facing in the direction toward the outer header wall.

5. The glass run channel of claim 1, wherein:
the insert body includes an upper insert body portion extending from the upper insert wall and a lower insert body portion extending from the hook wall; and
a step is formed between the upper insert body portion and the lower insert body portion such that the lower insert body portion is recessed further from the outer header wall relative to the upper insert body portion.

6. The glass run channel of claim 1, wherein:
the one or more inserts includes a first side edge and a second side edge opposite the first side edge along the upper insert wall, the insert body, and the hook wall;
a first width extends between the first side edge and the second side edge at the upper insert wall; and
a second width less than the first width extends between the first side edge and the second side edge at the hook wall.

7. The glass run channel of claim 1, wherein a plurality of holes are formed in the one or more inserts.

8. The glass run channel of claim 7, wherein the plurality of holes are arranged in rows.

9. The glass run channel of claim 1, wherein the hook wall comprises:
a first portion extending from the insert body away from the outer header wall and parallel to the upper insert wall;
a second portion extending in the direction away from the upper insert wall; and
a third portion extending from the second portion in the direction toward the outer header wall.

10. The glass run channel of claim 1, wherein an imaginary plane extends in a vehicle vertical direction through the cover lip and the opening.

11. A vehicle comprising:
a vehicle body; and
a door including an outer door panel, an inner door panel cooperating with the outer door panel to define a receiving area, and a glass run channel provided within the receiving area, the glass run channel including:
a header comprising:
an upper header wall;
an outer header wall extending from the upper header wall;
an inner header wall extending from the upper header wall opposite the outer header wall;
a cover lip extending from a distal end of the inner header wall; and
a hook portion initially extending from the distal end of the inner header wall below the cover lip in a direction away from the cover lip; and
one or more inserts encased within the header, the one or more inserts including an upper insert wall provided within the upper header wall, an insert body extending from the upper insert wall, and a hook wall initially extending from a lower end of the insert body, extending in a direction away from the upper insert wall, and extending through the hook portion of the header,
wherein the hook portion of the header surrounding the hook wall of the one or more inserts defines a hook having an opening formed below and between the cover lip and a distal end of the hook portion, the hook extending in a direction toward the outer door panel.

12. The vehicle of claim 11, wherein the one or more inserts comprises a plurality of inserts spaced apart from one another.

13. The vehicle of claim 11, wherein the hook wall of the one or more inserts defines the opening facing toward the outer header wall.

14. The vehicle of claim 11, wherein the hook wall comprises:
a first portion extending from the insert body away from the outer header wall and parallel to the upper insert wall;
a second portion extending away from the upper insert wall; and
a third portion extending from the second portion opposite the first portion and toward the outer header wall.

15. A method comprising:
forming a header including an outer header wall, an upper header wall extending from the outer header wall, an inner header wall extending from the upper header wall, a cover lip extending from a distal end of the inner header wall, and a hook portion initially extending from the distal end of the inner header wall below the cover lip in a direction away from the cover lip;
forming one or more notches in the upper header wall and the inner header wall;
positioning one or more inserts within a respective one of the one or more notches, the one or more inserts includes an upper insert wall provided within the upper header wall, an insert body extending from the upper insert wall within the inner header wall, and a hook wall initially extending from a lower end of the insert body, extending in a direction away from the upper insert wall, and extending through the hook portion of the header; and injecting material into the header to surround the one or more inserts, wherein the hook portion of the header surrounding the hook wall of the one or more inserts defines a hook having an opening formed below and between the cover lip and a distal end of the hook portion, the hook extending in a direction toward the outer header wall.

16. The method of claim 15, wherein:

the one or more notches comprises a plurality of notches, and the one or more inserts comprises a plurality of inserts, wherein the material is thermoplastic vulcanizate, wherein the hook wall comprises:

a first portion extending from the insert body away from the outer header wall and parallel to the upper insert wall;

a second portion extending away from the upper insert wall; and a third portion extending from the second portion toward the outer header wall.

* * * * *